United States Patent
Nagoshi (10) Patent No.: US 9,026,399 B2
(45) Date of Patent: May 5, 2015

(54) APPARATUS FOR DETECTING ABNORMALITY OF SENSOR

(75) Inventor: Katsuyuki Nagoshi, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 967 days.

(21) Appl. No.: 13/140,084

(22) PCT Filed: Dec. 18, 2009

(86) PCT No.: PCT/JP2009/007003
§ 371 (c)(1),
(2), (4) Date: Jun. 16, 2011

(87) PCT Pub. No.: WO2010/073566
PCT Pub. Date: Jul. 1, 2010

(65) Prior Publication Data
US 2011/0251825 A1 Oct. 13, 2011

(30) Foreign Application Priority Data
Dec. 25, 2008 (JP) ................................. 2008-330441

(51) Int. Cl.
*G06F 11/30* (2006.01)
*F02D 41/22* (2006.01)
*F02D 41/00* (2006.01)

(52) U.S. Cl.
CPC .......... *F02D 41/222* (2013.01); *F02D 41/0007* (2013.01); *F02D 41/0055* (2013.01); *F02D 2041/0067* (2013.01); *F02D 2200/0414* (2013.01); *Y02T 10/40* (2013.01)

(58) Field of Classification Search
CPC ........................... F02D 41/222; F02D 41/0007
USPC ........................................................... 702/183
See application file for complete search history.

(56) References Cited

U.S. PATENT DOCUMENTS

| | | | | |
|---|---|---|---|---|
| 4,967,717 A | * | 11/1990 | Miyazaki et al. | 73/114.74 |
| 6,434,476 B1 | * | 8/2002 | Zagone | 701/115 |
| 7,085,681 B1 | * | 8/2006 | Williams et al. | 702/183 |
| 2003/0182048 A1 | * | 9/2003 | Wang et al. | 701/107 |

(Continued)

FOREIGN PATENT DOCUMENTS

| | | |
|---|---|---|
| JP | 64 83845 | 3/1989 |
| JP | 10 153125 | 6/1998 |

(Continued)

OTHER PUBLICATIONS

International Search Report issued Jan. 26, 2010 in PCT/JP09/07003 filed Dec. 18, 2009.

*Primary Examiner* — Janet Suglo
*Assistant Examiner* — Stephanie Bloss
(74) *Attorney, Agent, or Firm* — Oblon, McClelland, Maier & Neustadt, L.L.P.

(57) ABSTRACT

Temperatures of intake-air temperature, intercooler outlet temperature and intake manifold temperature sensors are compared in cold time of an engine to determine any characteristic abnormality of the sensors. A first temperature difference is obtained from temperatures of the intercooler outlet temperature sensor before and after increase in boost pressure to determine any characteristic abnormality of the intercooler outlet temperature sensor. A second temperature difference is obtained from temperatures of the intake manifold temperature and intercooler outlet temperature sensors after opening an EGR valve to determine any characteristic abnormality of the intake manifold temperature sensor.

3 Claims, 5 Drawing Sheets

(56) References Cited

U.S. PATENT DOCUMENTS

2005/0066658 A1    3/2005    Longnecker et al.
2006/0021361 A1*    2/2006    Gerum et al. .................. 62/127
2008/0151964 A1*    6/2008    Hagen et al. ................. 374/152

FOREIGN PATENT DOCUMENTS

| | | |
|---|---|---|
| JP | 2003 56394 | 2/2003 |
| JP | 2003 286888 | 10/2003 |
| JP | 2005 106063 | 4/2005 |

* cited by examiner

APPARATUS FOR DETECTING ABNORMALITY OF SENSOR

TECHNICAL FIELD

The present invention relates to an apparatus for detecting abnormality of sensors used with an internal combustion engine.

BACKGROUND ART

Figure 1:
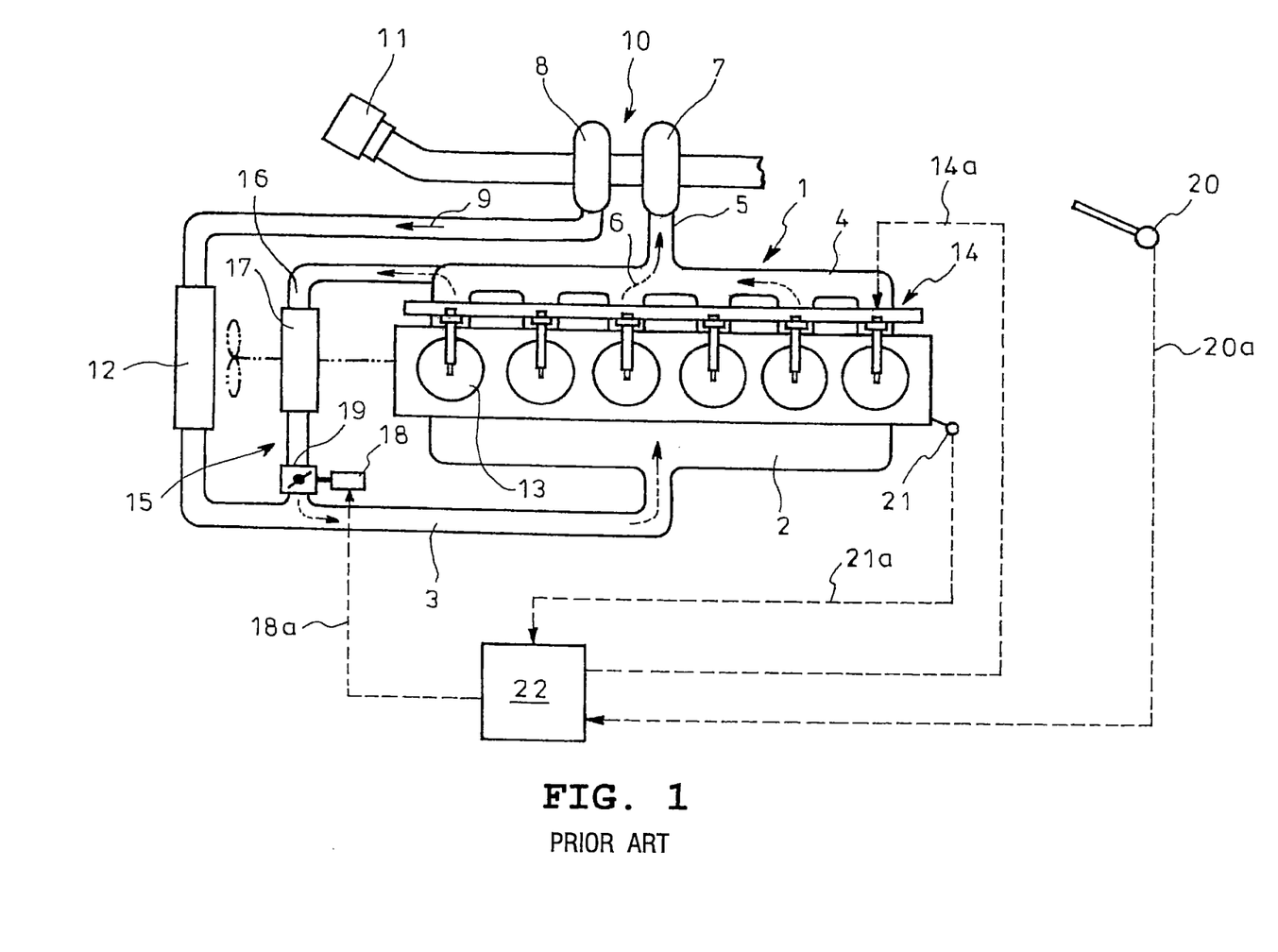
FIG. 1 is a schematic overview of a conventional engine.

FIG. 1 shows an example of a supercharged internal combustion engine 1 which has intake and exhaust passages 3 and 5 connected to intake and exhaust manifolds 2 and 4 of the engine 1, respectively. The exhaust passage 5 is provided with a turbine 7 driven by an exhaust gas 6, and the intake passage 3 is provided with a compressor 8 which produces compressed air 9 with the turbine 7. The turbine 7 and the compressor 8 make up a supercharger 10 as a turbocharger so as to supply the air 9 compressed by the compressor 8 of the supercharger 10 to the intake passage 3 in which an intercooler 12 is incorporated downstream of the compressor 8 and before the intake manifold 2. In FIG. 1, reference numerals 11, 13 and 14 denote an air cleaner, cylinders of the engine 1 and a fuel injector, respectively.

Disposed between the intake and exhaust passages 3 and 5 is an EGR means 15. The EGR means 15 of FIG. 1 interconnects the intake and exhaust manifolds 2 and 4 through an EGR piping (EGR passage) 16 provided with an EGR cooler 17 and an EGR valve 19 opened/closed by an actuator 18.

An accelerator pedal (not shown) of a driver seat is provided with an accelerator sensor (load sensor) 20 which detects an accelerator opening degree as a load of the engine 1. The engine 1 is equipped with a rotation sensor 21 which detects a rotation number thereof. Accelerator opening degree and rotation number signals 20a and 21a of the sensors 20 and 21, respectively, are input to a controller 22 which constitutes an engine control computer (ECU: Electronic Control Unit).

On the other hand, the controller 22 outputs an opening degree command signal 18a which gives a command for an opening degree to the actuator 18 of the EGR valve 19 as well as a fuel injection signal 14a which gives commands for injection timing and amount of fuel to the fuel injector 14 for injecting fuel into the cylinders 13.

During an operation of the engine 1, the controller 22 controls the EGR valve 19 on the basis of the accelerator opening degree and rotation number signals 20a and 21a to maintain the opening degree of the EGR valve 19 at a position depending on an operating state of the engine 1, thereby recirculating the EGR gas to the intake passage 3 for reduction of $NO_x$ in the exhaust gas.

The internal combustion engine is equipped with an intake manifold temperature sensor (not shown) adjacent to an inlet of the intake manifold 2. An intake manifold temperature signal from the intake manifold temperature sensor is input to the controller 22 and is utilized for various controls.

Some prior art literatures describe those including two intake-air temperature sensors which detect intake-air temperatures upstream and downstream of a supercharger and utilizing the two intake-air temperature sensors under the condition of, for example, a boost pressure to detect a failure of the intake-air temperature sensors (see, for example, Patent Literature 1).

CITATION LIST

Patent Literature

[Patent Literature 1] JP 10-153125A

SUMMARY OF INVENTION

Technical Problems

However, in such conventional configurations, a characteristic abnormality of an intake manifold temperature sensor is not easy to detect, so that it has been demanded to easily and reliably detect a characteristic abnormality of the sensor. Those using two intake-air temperature sensors located upstream and downstream of a supercharger among prior art literatures, which have limited conditions available for comparison of the intake-air temperature sensors, have a problem that a characteristic abnormality of a sensor cannot be reliably detected.

The invention was made in view of the above and has its object to provide an apparatus for detecting abnormality of sensors which easily and reliably detects characteristic abnormality of the sensors.

Solution to Problems

An apparatus for detecting abnormality of sensors according to the invention comprises an intake passage of an engine for intake of air from a compressor via an intercooler into an intake manifold, an EGR passage for returning an EGR gas from an exhaust passage to the intake passage of the engine through an EGR cooler and an EGR valve, an intake-air temperature sensor in the intake passage upstream of the compressor for detecting a temperature of intake air to the engine, an intercooler outlet temperature sensor in the intake passage downstream of the intercooler and before an outlet of the EGR passage for detecting an outlet temperature of the intercooler and an intake manifold temperature sensor in the intake passage between the outlet of the EGR passage and the intake manifold for detecting a temperature of the intake manifold, the apparatus being configured to compare temperatures of the intake-air temperature sensor, the intercooler outlet temperature sensor and the intake manifold temperature sensor in cold time of the engine to determine that when one of the sensors is at a different temperature, the sensor at the different temperature has a characteristic abnormality, to obtain a first temperature difference from temperatures of the intercooler outlet temperature sensor before and after increase in boost pressure to determine that the intercooler outlet temperature sensor has a characteristic abnormality when the first temperature difference is smaller than a first reference limit and to obtain a second temperature difference from temperatures of the intake manifold temperature sensor and of the intercooler outlet temperature sensor after opening the EGR valve to determine that the intake manifold temperature sensor has a characteristic abnormality when the second temperature difference is smaller than a second reference limit.

It is preferable that the apparatus for detecting abnormality of sensors according to the invention further comprises an EGR outlet temperature sensor in the EGR passage downstream of the EGR cooler and before the EGR valve for detecting an outlet temperature of the EGR gas, the apparatus being configured to determine that the EGR outlet temperature sensor has a characteristic abnormality when a first temperature of the EGR outlet temperature sensor before opening the EGR valve is compared with a first reference value for EGR temperature to find that the first temperature is higher than the first reference value for EGR temperature or when a second temperature of the EGR outlet temperature sensor after opening the EGR valve is compared with a second reference value for EGR temperature to find that the second temperature is lower than the second reference value for EGR temperature.

Thus, on the basis of the fact that, in an idling state in cold time, intake air at substantially a same temperature flows through the intake passage and the intake-air temperature sensor, the intercooler outlet temperature sensor and the intake manifold temperature sensor normally detect the same temperature, it is determined that all the sensors may be normal when temperatures of the sensors are compared to find that all of the sensors are at the same temperature. When one of the sensors is at a different temperature, it is determined that the sensor has a characteristic abnormality.

On the basis of the fact, when the boost pressure increases, a temperature is raised downstream of a supercharger and the intercooler outlet temperature sensor detects a temperature raised by the first reference limit or greater, it is determined that the intercooler outlet temperature sensor is normal when the first temperature difference obtained from the temperatures of the intercooler outlet temperature sensor after and before increase in the boost pressure is greater than the first reference limit. When the first temperature difference is smaller than the first reference limit, it is determined that the intercooler outlet temperature sensor has a characteristic abnormality.

Further, when the EGR gas flows through the EGR passage, the temperature of the EGR passage is raised and the intake manifold temperature sensor detects a temperature raised by the second reference limit or greater. On the basis of the fact, it is determined that the intake manifold temperature sensor is normal when the second temperature difference obtained from the temperatures of the intake manifold temperature sensor and of the intercooler outlet temperature sensor after opening the EGR valve is greater than the second reference limit. When the second temperature difference is smaller than the second reference limit, it is determined that the intake manifold temperature sensor has a characteristic abnormality.

Further, in the case where the EGR outlet temperature sensor is provided in the EGR passage downstream of the EGR cooler and before the EGR valve to detect the outlet temperature of the EGR gas, the temperature of the EGR passage is normally lower than the first reference value for EGR temperature before the EGR gas flows through the EGR passage and is higher than the second reference value for EGR temperature after the EGR gas flows. On the basis of the fact, it is determined that the sensor is normal when the temperature of the EGR passage is lower than the first reference value for EGR temperature before the EGR gas flows through the EGR passage and is higher than the second reference value for EGR temperature after the EGR gas flows through the EGR passage. When the temperature of the EGR passage is higher than the first reference value for EGR temperature before the EGR gas flows through the EGR passage or is lower than the second reference value for EGR temperature after the EGR gas flows through the EGR passage, it is determined that the sensor is abnormal.

Advantageous Effects of Invention

According to the apparatus for detecting abnormality of sensors of the invention, excellent effects can be achieved as follows.

(I) In cold time, a plurality of sensors can be cross-checked to easily and properly detect presence or absence of the characteristic abnormality. As to an intercooler outlet temperature sensor and an intake manifold temperature sensor, the presence or absence of the characteristic abnormality is detected not only in cold time but also at the time of warm-up when a boost pressure is increased or when the ERG flows down, so that the characteristic abnormality can be more easily and reliably detected.

(II) The presence or absence of the characteristic abnormality is continuously detected in the EGR outlet temperature sensor as well as the intake-air temperature sensor, the intercooler outlet temperature sensor and the intake manifold temperature sensor, so that the characteristic abnormality can be easily detected.

DESCRIPTION OF EMBODIMENT

An embodiment of the invention will be described with reference to the drawings.

FIGS. 2 to 7 show the embodiment of the invention in which parts similar to those in FIG. 1 are represented by the same reference numerals.

Figure 2:
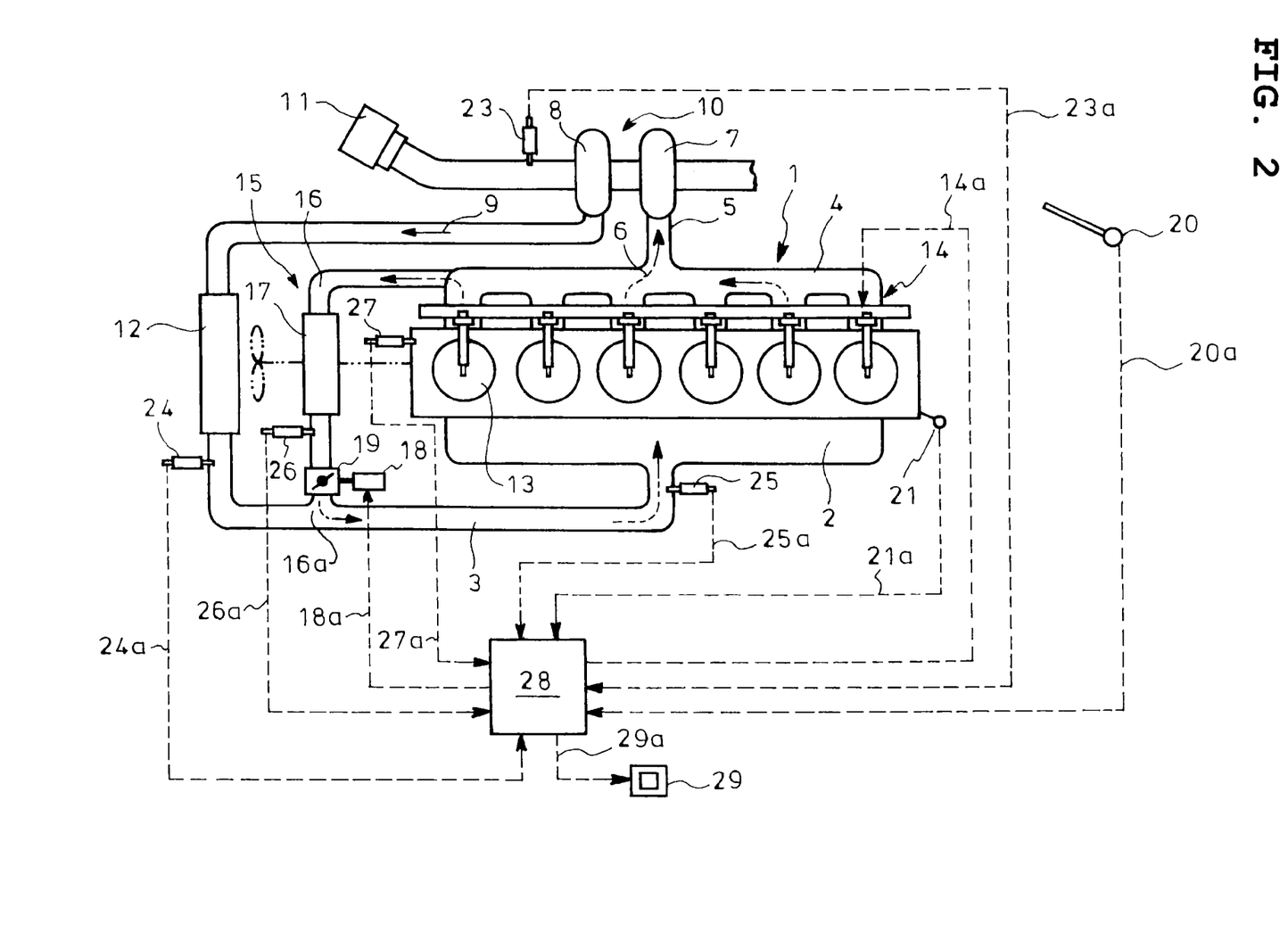
FIG. 2 is a schematic overview of an embodiment of the invention.

The embodiment includes an intake-air temperature sensor 23 which detects a temperature of intake air to an engine 1 upstream of a compressor 8. An intercooler outlet temperature sensor 24 detecting an outlet temperature of an intercooler 12 is incorporated in an intake passage 3 downstream of the intercooler 12 and before an outlet 16a of an EGR piping (EGR passage) 16, and an intake manifold temperature sensor 25 detecting a temperature of an intake manifold 2 is incorporated in the intake passage 3 between the outlet 16a of the EGR piping 16 and the intake manifold 2. An EGR outlet temperature sensor 26 detecting an outlet temperature of an EGR gas is incorporated in the EGR piping 16 downstream of an EGR cooler 17 and before an EGR valve 19. The intercooler outlet temperature sensor 24 is located adjacent to an outlet of the intercooler 12; the intake manifold temperature sensor 25 is located adjacent to an inlet of the intake manifold 2; and the EGR outlet temperature sensor 26 is located adjacent to an outlet of the EGR cooler 17. The engine 1 is equipped with a water temperature sensor 27 which detects a temperature of cooling water.

An accelerator pedal (not shown) of a driver seat is provided with an accelerator sensor (load sensor) 20 which detects an accelerator opening degree as a load of the engine 1. The engine 1 is equipped with a rotation sensor 21 which detects a rotation number thereof.

Input to a controller 28 constituting an engine control computer (ECU: Electronic Control Unit) are an intake temperature signal 23a from the intake-air temperature sensor 23, an intercooler outlet temperature signal 24a from the intercooler outlet temperature sensor 24, an intake manifold temperature signal 25a from the intake manifold temperature sensor 25, an EGR outlet temperature signal 26a from the EGR outlet temperature sensor 26, a cooling water temperature signal 27a from the water temperature sensor 27, and an accelerator opening degree signal 20a and a rotation number signal 21a from the accelerator sensor 20 and the rotation sensor 21.

On the other hand, output from the controller 28 in accordance with the input signals are an opening degree command signal 18a which gives a command for an opening degree to the actuator 18 of the EGR valve 19, a display signal 29a to displaying means 29 such as a hazard lamp and a fuel injection signal 14a which gives commands for injection timing and amount of fuel to the fuel injector 14 injecting fuel to cylinders 13.

Figure 3:
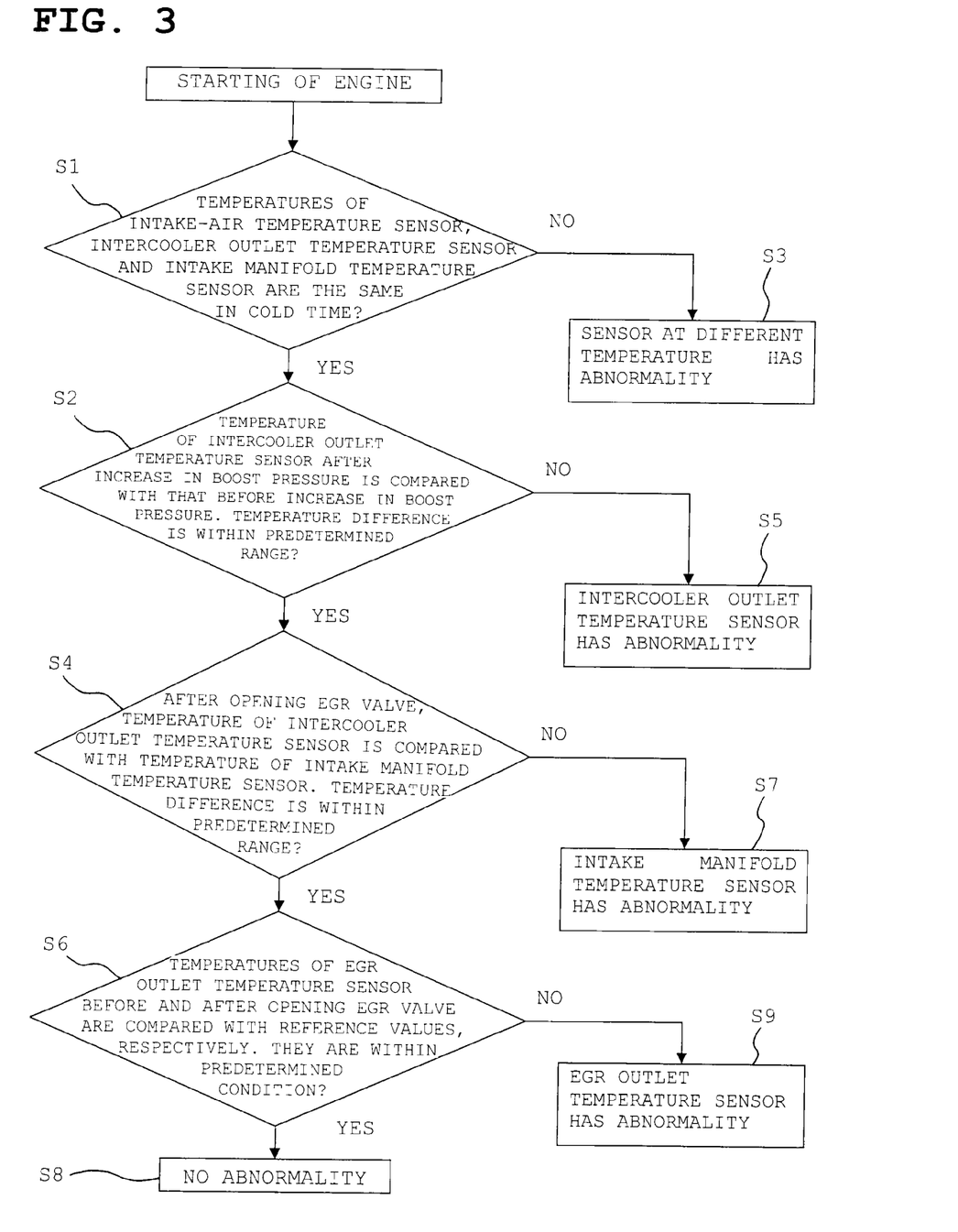
FIG. 3 is a flowchart of processing in the embodiment of the invention.

The controller 28 receives input of control of a flow shown in FIG. 3 and processes the signals 23a, 24a, 25a and 26a from the intake-air temperature sensor 23, the intercooler outlet temperature sensor 24, the intake manifold temperature sensor 25 and the EGR outlet temperature sensor 26 in accordance with the control of the flow.

An operation of the embodiment of the invention will be described hereinafter.

When reducing production of $NO_x$, the controller 28 outputs the opening degree command signal 18a to the actuator 18 of the EGR valve 19 on the basis of the accelerator opening degree and rotation number signals 20a and 21a in the operating range of the engine 1 to adjust the opening degree of the EGR piping 16 and causes a portion of exhaust to flow from the exhaust manifold 4 through the EGR piping 16 into the intake manifold 2, thereby lowering a combustion temperature in the cylinders 13 to reduce the production of $NO_x$.

With starting of the engine, the controller 28 executes the following processing in accordance with a procedure of FIG. 3.

First, in an idling state at cold starting of the engine 1, temperatures of the intake-air temperature sensor 23, the intercooler outlet temperature sensor 24 and the intake manifold temperature sensor 25 are compared (at time a in FIG. 4) to determine in cross-check whether all the temperatures are the same or not (step S1). This determination (step S1) is made when a water temperature of the engine 1 is low based on the water temperature sensor 27 and the EGR valve 19 is closed and no EGR gas flows, and is limited to, for prevention of misdetection, only an engine state where the intake air flows and is not supercharged.

Figure 4:
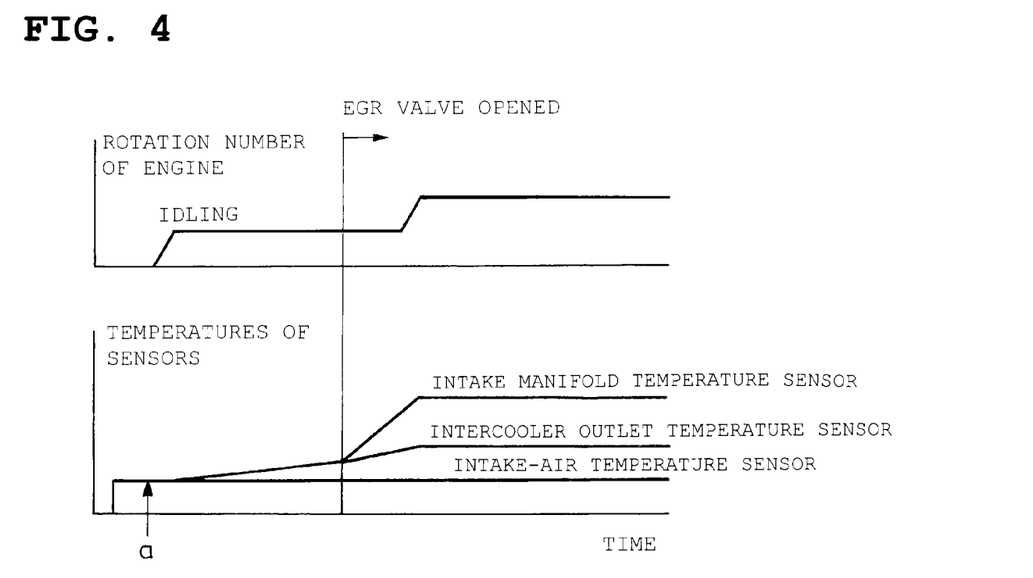
FIG. 4 is a graph conceptually representing a condition of comparing temperatures of an intake-air temperature sensor, an intercooler outlet temperature sensor and an intake manifold temperature sensor in cold time.

At the time of this determination (step S1), cool air (intake air) flows through the intake passage 3 substantially at a same temperature and the intake-air temperature sensor 23, the intercooler outlet temperature sensor 24 and the intake manifold temperature sensor 25 normally detect the same temperature. Thus, when the temperature signals 23a, 24a and 25a from the intake-air temperature sensor 23, the intercooler outlet temperature sensor 24 and the intake manifold temperature sensor 25 are compared to find all of the sensors 23, 24 and 25 being at the same temperature (YES at step S1), it is determined that all the sensors may be normal and the procedure goes to a next phase (step S2). On the other hand, when one of the intake-air temperature sensor 23, the intercooler outlet temperature sensor 24 and the intake manifold temperature sensor 25 is at a different temperature (NO at step S1), it is determined that the sensor at the different temperature has a characteristic abnormality (step S3).

After the determination that all the sensors are normal (YES at step S1), the procedure is in a phase of checking a characteristic abnormality of the intercooler outlet temperature sensor 24 after warming the engine; a temperature of the intercooler outlet temperature sensor 24 before supercharging (before increase in boost pressure) acquired in the preceding phase (step S1) is subtracted from a temperature of the intercooler outlet temperature sensor 24 after supercharging (after increase in boost pressure) to obtain a first temperature difference which is compared with first reference limits ($\Delta t1$ and $\Delta t1'$ in FIG. 5) (step S2).

Figure 5:
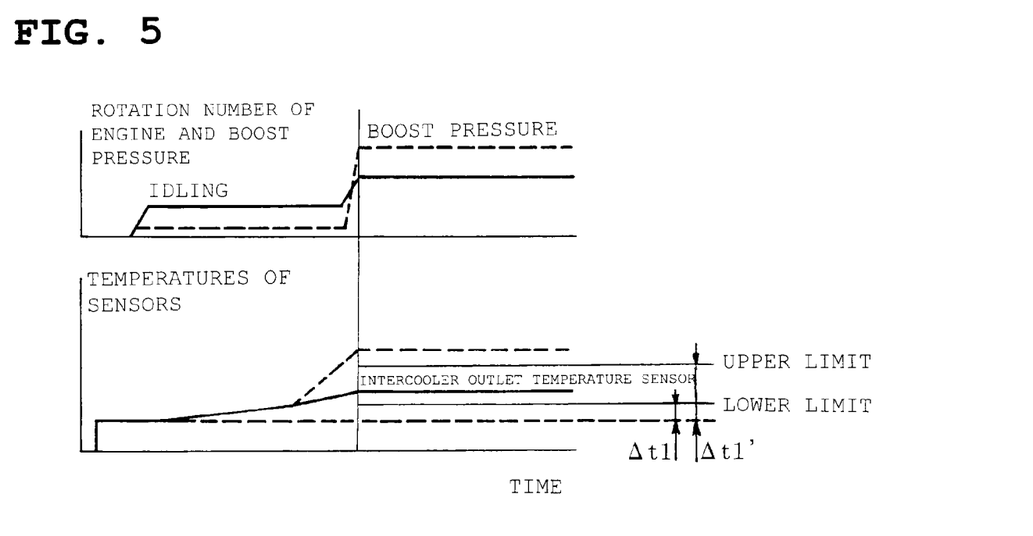
FIG. 5 is a graph conceptually representing a condition of comparing a temperature of the intercooler outlet temperature sensor in warm-up and that in cold time.

At the time of this determination (step S2), the increased boost pressure brings about temperature rise so that the intercooler outlet temperature sensor 24 normally detects a temperature raised by the first reference limit $\Delta t1$ or more and $\Delta t1'$ or less. On the basis of this fact, when the first temperature difference of the intercooler outlet temperature sensor 24 is equal to or greater than the first reference limit $\Delta t1$ and equal to or smaller than $\Delta t1'$ (YES at step S2), it is determined that the intercooler outlet temperature sensor 24 is normal and the procedure goes to a next phase (step S4). On the other hand, when the first temperature difference of the intercooler outlet temperature sensor 24 is smaller than the first reference limit $\Delta t1$ or is greater than $\Delta t1'$ (NO at step S2), it is determined that the intercooler outlet temperature sensor 24 has a characteristic abnormality (step S5).

After the determination that the intercooler outlet temperature sensor 24 is normal (YES at step S2), the procedure is in a phase of checking the intake manifold temperature sensor 25 after warming the engine; a temperature of the intercooler outlet temperature sensor 24 after opening the EGR valve 19 is subtracted from a temperature of the intake manifold temperature sensor 25 after opening the EGR valve 19 to obtain a second temperature difference; and the second temperature difference is compared with second reference limits ($\Delta t2$ and $\Delta t2'$ in FIG. 6) (step S4). Although the phase of determining a characteristic abnormality of the intercooler outlet temperature sensor 24 after warm-up (step S2) and the phase of determining a characteristic abnormality of the intake manifold temperature sensor 25 after warm-up (step S4) are preferably processed in the order of the flow of FIG. 3, the phase of determining a characteristic abnormality of the intercooler outlet temperature sensor 24 after warm-up (step S2) may be processed after processing the phase of determining a characteristic abnormality of the intake manifold temperature sensor 25 after warm-up (step S4) or these two phases may be processed at the same time.

Figure 6:
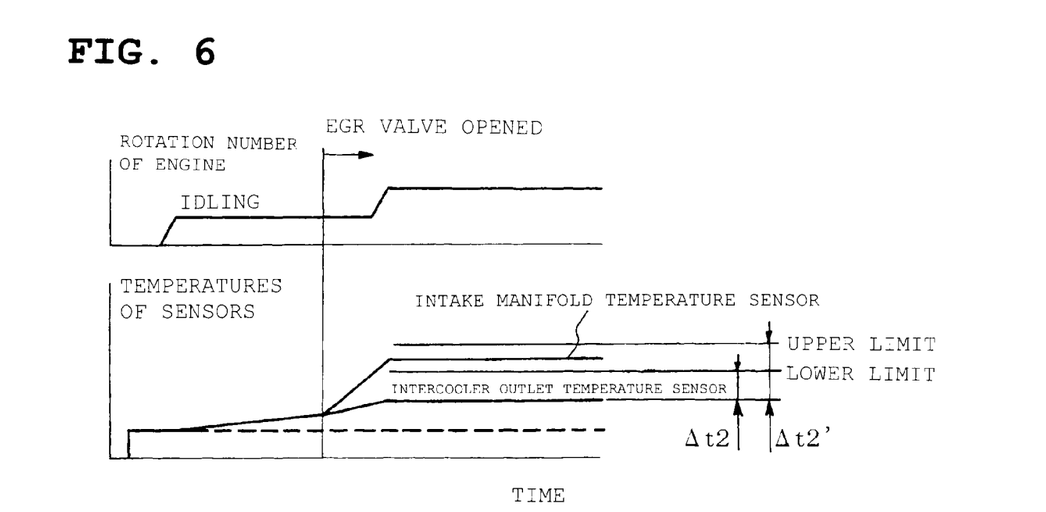
FIG. 6 is a graph conceptually representing a condition of comparing temperatures of the intake manifold temperature sensor and of the intercooler outlet temperature sensor in warm-up.

At the time of this determination (step S4), owing to the raised temperature of the intake manifold 2 due to flow-down of the EGR gas in the EGR piping 16, the intake manifold temperature sensor 25 normally detects a temperature raised by the second reference limit $\Delta t2$ or greater and $\Delta t2'$ or smaller as compared with the intercooler outlet temperature sensor 24. On the basis of this fact, it is determined that the intake manifold temperature sensor 25 is normal and the procedure goes to a next phase (step S6) when the second temperature difference of the intake manifold temperature sensor 25 is equal to or greater than the second reference limit $\Delta t2$ and equal to or smaller than $\Delta t2'$ (YES at step S4). On the other hand, when the second temperature difference of the intake manifold temperature sensor 25 is smaller than the second reference limit $\Delta t2$ or is greater than $\Delta t2'$ (NO at step S4), it is determined that the intake manifold temperature sensor 25 has a characteristic abnormality (step S7). Since a change in temperature of the intake manifold 2 may be small when the temperature of the EGR gas is low or when the rate of flow admixed with the EGR gas is low, it is preferable that the detection process of the intake manifold temperature sensor 25 is executed on the condition that the temperature of the EGR gas is high or that the rate of flow admixed with the EGR gas is high. If a characteristic abnormality is caused due to fixation of the EGR valve 19, the second temperature difference is not within the second reference limits or goes negative and thus the characteristic abnormality can be discriminated.

After the determination that the intake manifold temperature sensor 25 is normal (YES at step S4), the procedure is in a phase of checking a characteristic abnormality of the EGR outlet temperature sensor 26; a first temperature (T1 in FIG. 7) of the EGR outlet temperature sensor 26 before opening the EGR valve 19 is compared with a first reference value for EGR temperature; and a second temperature (T2 in FIG. 7) of the EGR outlet temperature sensor 26 after opening the EGR valve 19 is compared with a second reference value for EGR temperature (step S6). Although the phase of checking a characteristic abnormality of the EGR outlet temperature sensor 26 (step S6) may be processed in the order of the flow of FIG. 3, it is preferable that the phase of comparing the first temperature with the first reference value for EGR temperature is processed before the phase of determining a characteristic abnormality of the intercooler outlet temperature sensor 24 after warm-up (step S2) or before the phase of determining a characteristic abnormality of the intake manifold temperature sensor 25 after warm-up (step S4). The phase of checking a characteristic abnormality of the EGR outlet temperature sensor 26 (step S6) may be processed at the same time with the other processes, or the order may be rearranged.

Figure 7:
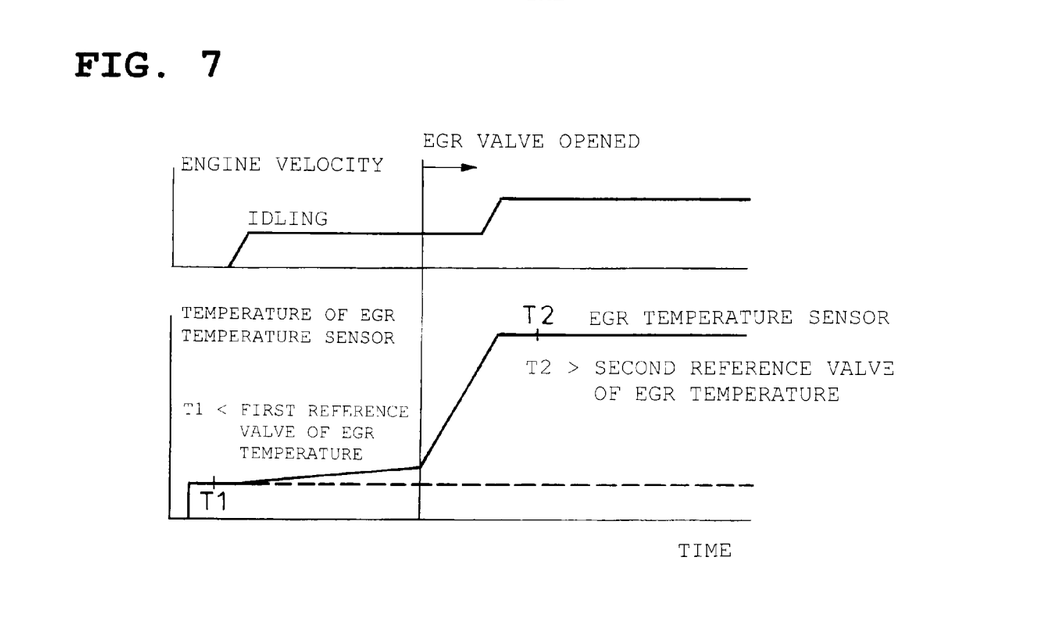
FIG. 7 is a graph conceptually representing a condition of comparing an EGR outlet temperature sensor in warm-up and that in cold time.

At the time of the determination (step S6), on the basis of the fact that the temperature T1 in the EGR piping 16 is normally lower than the first reference value for EGR temperature before opening the EGR valve 19 and that the temperature T2 in the EGR piping 16 is higher than the second reference value for EGR temperature even downstream of the EGR cooler 17 after opening the EGR valve 19, it is determined that the sensor is normal (step S8) when the temperature in the EGR piping 16 is lower than the first reference value for EGR temperature before opening the EGR valve 19 and when the temperature in the EGR piping 16 is higher than the second reference value for EGR temperature after opening the EGR valve 19 (YES at step S6). On the other hand, when the temperature in the EGR piping 16 is higher than the first reference value for EGR temperature before opening the EGR valve 19 or when the temperature in the EGR piping 16 is lower than the second reference value for EGR temperature after opening the EGR valve 19 (NO at step S6), it is determined that the EGR outlet temperature sensor 26 has a characteristic abnormality (step S9). The outlet temperature of the EGR cooler 17 varies depending on presence and absence of a flow of the EGR gas; when the outlet temperature is already high in cold time (the EGR valve 19 is closed and no EGR gas flows), fixation on the higher temperature side can be detected; and if the outlet temperature is already low in warm-up (the EGR valve 19 is opened and an EGR gas flows), fixation on the lower temperature side can be detected.

When it is determined that the EGR outlet temperature sensor 26 is normal (step S8), the procedure is finally terminated with the determination that all the sensors 23, 24, 25 and 26 are normal. When it is determined that any one of the sensors 23, 24, 25 and 26 has a characteristic abnormality (step S3, S5, S7 or S9), the controller 28 outputs the display signal 29a to the displaying means 29 such as a hazard lamp to perform display such as lighting on the displaying means 29, thereby indicating the presence of the characteristic abnormality (step S9).

Thus, according to the embodiment as described above, the plural sensors 23, 24 and 25 can be cross-checked to easily and properly detect the presence or absence of the characteristic abnormality in cold time. As to the intercooler outlet temperature sensor 24 and the intake manifold temperature sensor 25, the presence or absence of the characteristic abnormality is detected not only in cold time but also at the time of warm-up when a boost pressure is increased or when the ERG gas flows down, so that the characteristic abnormality can be more easily and reliably detected.

The embodiment continuously detects the presence or absence of the characteristic abnormality in the EGR outlet temperature sensor 26 as well as in the intake-air temperature sensor 23, the intercooler outlet temperature sensor 24 and the intake manifold temperature sensor 25 and thus, the characteristic abnormality can be easily detected. Characteristic abnormality not only of sensors themselves but also in the intake-air temperature, the outlet temperature of the intercooler 12, the temperature of the intake manifold 2 and the temperature of the EGR piping 16 can be detected so that various failures and abnormalities can be detected.

It is to be understood that an apparatus for detecting abnormality of sensors according to the invention is not limited to the above embodiment and that various changes and modifications may be made without departing from the scope of the invention.

REFERENCE SIGNS LIST 1 engine
2 intake manifold
3 intake passage
5 exhaust passage
8 compressor
12 intercooler
16 EGR piping (EGR passage)
16a outlet
17 EGR cooler
19 EGR valve
23 intake-air temperature sensor
24 intercooler outlet temperature sensor
25 intake manifold temperature sensor
26 EGR outlet temperature sensor

The invention claimed is:

1. An apparatus for detecting abnormality of sensors comprising an intake passage of an engine for intake of air from a compressor via an intercooler into an intake manifold, an EGR passage for returning an EGR gas from an exhaust passage to the intake passage of the engine through an EGR cooler and an EGR valve, an intake-air temperature sensor in the intake passage upstream of the compressor for detecting a temperature of intake air to the engine, an intercooler outlet temperature sensor in the intake passage downstream of the intercooler and before an outlet of the EGR passage for detecting an outlet temperature of the intercooler, and an intake manifold temperature sensor in the intake passage between the outlet of the EGR passage and the intake manifold for detecting a temperature of the intake manifold, the apparatus being configured to compare temperatures of the intake-air temperature sensor, the intercooler outlet temperature sensor and the intake manifold temperature sensor in cold time of the engine to determine that when one of the sensors is at a different temperature, the sensor at the different temperature has a characteristic abnormality, to obtain a first temperature difference from temperatures of the intercooler outlet temperature sensor before and after increase in boost pressure to determine that the intercooler outlet temperature sensor has a characteristic abnormality when the first temperature difference is smaller than a first reference limit, and to obtain a second temperature difference from temperatures of the intake manifold temperature sensor and of the intercooler outlet temperature sensor after opening the EGR valve to determine that the intake manifold temperature sensor has a characteristic abnormality when the second temperature difference is smaller than a second reference limit, wherein the presence or absence of a characteristic abnormality in the intake-air temperature sensor, the intercooler outlet temperature sensor and the intake manifold temperature sensor are continuously detected.

2. The apparatus for detecting abnormality of sensors according to claim 1, further comprising an EGR outlet temperature sensor in the EGR passage downstream of the EGR cooler and before the EGR valve for detecting an outlet temperature of the EGR gas, the apparatus being configured to determine that the EGR outlet temperature sensor has a characteristic abnormality when a first temperature of the EGR outlet temperature sensor before opening the EGR valve is compared with a first reference value for EGR temperature to find that the first temperature is higher than the first reference value for EGR temperature or when a second temperature of the EGR outlet temperature sensor after opening the EGR valve is compared with a second reference value for EGR temperature to find that the second temperature is lower than the second reference value for EGR temperature.

3. An apparatus for detecting an abnormality of sensors in an engine having an intake passage for intake of air from a compressor via an intercooler into an intake manifold, an EGR passage for returning an EGR gas from an exhaust passage to the intake passage of the engine through an EGR cooler and an EGR valve, wherein the sensors comprise an intake-air temperature sensor provided in the intake passage upstream of the compressor for detecting a temperature of intake air to the engine, an intercooler outlet temperature sensor provided in the intake passage downstream of the intercooler and before an outlet of the EGR passage for detecting an outlet temperature of the intercooler, and an intake manifold temperature sensor provided in the intake passage between the outlet of the EGR passage and the intake manifold for detecting a temperature of the intake manifold, the apparatus comprising a controller receiving detected temperature signals from the intake-air temperature sensor, the intercooler outlet temperature sensor and the intake manifold temperature sensor, and configured to compare the detected temperatures of the intake-air temperature sensor, the intercooler outlet temperature sensor and the intake manifold temperature sensor when the engine is cold, and to determine an abnormality for any one of the sensors inputting a temperature to the controller that is different from the temperature input by the other sensors, to obtain a first temperature difference from temperatures of the intercooler outlet temperature sensor before and after an increase in boost pressure by the compressor, and to determine that the intercooler outlet temperature sensor has an abnormality when the first temperature difference is smaller than a first reference limit, and to obtain a second temperature difference from temperatures of the intake manifold temperature sensor and of the intercooler outlet temperature sensor after opening the EGR valve, and to determine that the intake manifold temperature sensor has a characteristic abnormality when the second temperature difference is smaller than a second reference limit.

* * * * *